3,180,749
WATER SOLUBLE POLYMERS OF EPOXIDIZED FATS
Thomas W. Findley, La Grange, and Harold E. Saewert, Park Forest, Ill., assignors to Swift & Company, Chicago, Ill., a corporation of Illinois
No Drawing. Filed Nov. 6, 1961, Ser. No. 150,200
10 Claims. (Cl. 106—243)

This invention relates to prepolymer compositions which are water-soluble and can be applied from aqueous solution followed by cure to form tough resinous materials. More particularly, the invention is concerned with a method for preparing water-soluble polymers from oxirane-containing fatty materials and also the products obtained.

Many coating and film-forming resins are commercially available which are very satisfactory for the coating of a variety of substrates such as metallic surfaces, glass, wood, ceramics, etc. Yet, the majority of these coating compositions which form a desirable, hard, coated surface must be deposited from organic solutions of the polymers inasmuch as these polymers are not water-soluble. The hazards presented by the flammability of many organic solvents as well as the dangers of inhalation of vapors of these solvents have encouraged a continuing search for coating and film forming materials which will form a tough, hard coating or film and which can be cast or deposited from non-flammable liquid carriers.

It is, accordingly, a principal object of this invention to provide improved water-soluble prepolymers derived from oxirane-containing fatty materials.

Another object of the invention is the provision of a method for the preparation of water-soluble prepolymers derived from oxirane-containing fatty materials.

Still another object of the invention is the provision of a method for forming films and coatings of water-soluble film forming materials and treating said films and coatings to provide tough, hard, yet flexible surfaces.

Additional objects, if not specifically set forth herein, will be readily apparent to those skilled in the art from the detailed description of the invention which follows.

Generally, the invention is concerned with the production of water-soluble prepolymers from oxirane-containing fatty materials by treating said fatty materials so as to open some but not all of the oxirane rings which are substituted along fatty chains and attach to the fatty chains at the position formerly occupied by the oxirane group an ester linkage attached to an aliphatic hydrocarbon radical or a benzenoid radical and finally terminating in one or more free carboxyl groups. Adjacent to this substitution on the fatty chain an hydroxyl group is substituted. The free carboxyl groups are then reacted with a cation-supplying composition which provides in said carboxyl group a volatile cation. The resulting composition is soluble in aqueous solutions and can be deposited on substrates from said aqueous solution followed by curing of the film or coating deposited to form a tough coating. The products are obtained by partially reacting a polyepoxidized fatty material having more than one epoxy group per molecule with a carboxyl-supplying base such as the organic dibasic acids, organic polybasic acids, and anhydrides thereof. The reaction between the polyepoxide and the carboxyl-supplying agent is carried out for a time sufficient to esterify at least one of the carboxyl groups of the carboxyl-supplying agent with an epoxy group of the polyepoxide and the reaction is terminated before all of the available carboxyl groups of the carboxyl-supplying base are reacted to form ester groups. While fatty epoxides have been reacted with polybasic acids in the past to form linear and cross-linked polymers, these polymers have, unlike the water-soluble prepolymers disclosed herein, been uniformly water-insoluble.

More particularly, the water-soluble prepolymers are prepared from the fatty polyepoxides by reacting the oxirane-containing fatty composition having more than about one epoxy group per molecule with an organic dicarboxylic or polycarboxylic acid or anhydride or mixtures thereof until at least one of the carboxyl groups of the organic acid is esterified with an oxirane group of the epoxide and at least one of the carboxyl groups of the acid or anhydride and at least one epoxy group of the epoxide is left unreacted. The esterification is terminated at this point and the polyester is converted to the water-soluble form by forming the salt at the free acid groups. The film or coating which may be deposited from the water solution may then be subjected to cure conditions involving the use of heat and/or cure accelerators to form a tough, flexible layer which is resistant to the effect of acids, alkali, and organic solvents such as hydrocarbons, alcohols, and ethers.

The reaction between the polyepoxide and carboxyl-supplying agent is effected by gently heating a mixture of the oxirane-containing composition and the acid or anhydride. The heating temperature and the time of heating varies with the reactivity of the polyepoxide and the functionality of the polycarboxylic acid or anhydride. Approximately stoichiometric amounts of the acid or anhydride should be employed to react with the epoxy groups in the polyepoxide. Usually one half mole of a dibasic acid or anhydride is provided for each available oxirane group in the polyepoxide. By "stoichiometric" amount of acid or anhydride is meant that sufficient acid or anhydride is employed to insure that one acid group be present for each epoxy group in the oxirane containing composition. In the case of an epoxidized triglyceride having four epoxy groups per mole, two moles of a dibasic acid or anhydride will be employed and where a tetrabasic acid is used as the carboxyl-supplying base only one mole will be required. Where the triglyceride has five epoxy groups per mole as with highly epoxidized linseed oil two and one half moles per mole of epoxidized linseed oil of a dibasic acid or anhydride is employed as the carboxyl reactant. In the prepolymer form at least one epoxy group and at least one carboxyl group in the composition are unreacted and free to combine when the composition is cured.

The reaction employed to produce the partially polymerized epoxide is most desirably carried out in the presence of a solvent. Unless the polycarboxylic acid used in the formation of the polyester is compatible with the epoxide it is difficult to obtain a single-phase reaction. A low to medium boiling mutual solvent is recommended for carrying out the reaction and in those cases where the solvent is employed it serves as an effective temperature control since the reaction can be carried out at the boiling point of the solvent or at a lower temperature. Usually, the more polar low and medium boiling solvents in which the epoxide and acid or anhydride are mutually soluble are preferred. Those alcohols, ethers, ketones, and esters, as well as mixtures thereof, which will not react with the polyepoxide or carboxyl-supplying base are particularly useful.

This group includes the lower aliphatic monohydric alcohols such as methanol, ethanol, propanol, isopropanol, butanol, and generally those lower alkanols and alkenols having 1–5 carbons. The lower aliphatic ethers and ketones such as ethyl ethers, butyl cellosolve, acetone, and methylethyl ketone are also satisfactory. Benzenoid solvents such as benzene, toluene, xylene can also be employed. Particularly useful solvents are tetrahydrofuran and dimethylformamide. The solvent shoud be reasonably volatile to permit removal thereof, if recovery is desired, from the composition at temperatures below the curing temperature. If the solvent is volatilized at elevated temperatures above about 215° C. during the curing operation, the coating or film is likely to be pitted.

The amount of solvent employed in the partial polymerization reaction is only that necessary to promote solubility of the polyepoxide and acid or anhydride. Larger quantities of solvent, while not adversely affecting the course of the partial polymerization are not recommended since larger quantities of solvent serve only to increase the duration of the solvent removal step later employed in isolating the prepolymer or in forming the cured film.

As the reaction between the polyepoxide and carboxyl-supplying base proceeds, the viscosity of the reaction mixture increases. The reaction should be stopped before the mixture gels. Another method for determining when the reaction should be terminated is that point where an aliquot drawn from the reaction mixture is soluble in dilute aqueous ammonia or other water-soluble base such as the alkali metal bases and water-soluble organic amines which form salts with the carboxyl group. Suitable bases which may be employed for this purpose include sodium hydroxide, potassium hydroxide, sodium carbonate, as well as the aforementioned aqueous ammonia.

The source of the oxirane groups, namely, the polyepoxide, may be any oxirane-containing composition characterized by one or more long-chain aliphatic hydrocarbon groups having

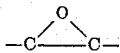

groups substituted on the aliphatic hydrocarbon chain. Esters of higher oxirane-containing fatty acids with aliphatic monohydric, dihydric, trihydric, tetrahydric, and pentahydric alcohols are useful. Other sources of the oxirane-containing material are the oxirane-containing higher aliphatic alcohols, amides, hydrazides, ketones, etc. These compositions, having one or more long-chain, 10–22 carbon alkyl or alkenyl radicals with the chains being substituted with one or more epoxy groups, are desirable sources of the epoxy configuration.

Suitable fatty acids which when epoxidized provide a very desirable source of the epoxy group include the synthetic and naturally occurring ethylenically unsaturated fatty acids such as oleic acid, palmitoleic acid, linoleic acid, linolenic acid, ricinoleic acid, 9,10- and 4,5-decenoic acid, 3,4-, 4,5-, 9,10-dodecenoic acid, and other mono-, di-, and triethylenically unsaturated faty acids having 10–22 carbons. These acids when epoxidized, either in the form of the acid or in the form of derivatives such as amides, hydrazides, or esters, are all suitable as the epoxy-containing material.

In addition, fatty ketones having one or more epoxy groups per molecule are very satisfactory. Diepoxy ketones such as 9,10,26,27-diepoxypentatriac octanone-18 and triepoxy ketones, as well as tetraepoxy ketones having from 10–35 carbons can also be employed. Epoxyketones of this type are disclosed in co-pending application S.N. 848,500, filed October 26, 1959, by one of the co-inventors herein.

An additional type of epoxy-containing material includes the epoxy polyamides which are epoxidized condensation products of unsaturated fatty acid esters and aliphatic polyamines. Bis(epoxy fatty amido) hydrocarbons, including bis(epoxystearmido) alkanes and tris(diepoxystearamido) alkanes as disclosed in U.S. Patent No. 3,042,692, issued July 3, 1962, may also be employed as the source of the oxirane groups.

Particularly preferred as the polyepoxide from which the water-soluble polymers are prepared are the high-oxirane higher fatty acid esters of mono-, di-, and polyhydric aliphatic alcohols. These esters may be characterized as high-oxirane fatty materials containing a plurality of oxirane rings or epoxy groups at those points in the fatty acyl radical which are normally occupied by double bonds in the original nonepoxidized fatty acid or ester. Monohydric and dihydric alcohol esters of the high-oxirane fatty acids which are contemplated include the aliphatic esters wherein the alcohol portion of the ester is a monohydric alcohol having 1–8 carbons and aliphatic alcohol esters of dihydric alcohols having 2–6 carbon atoms. Lower aliphatic alcohols of the olefin and paraffin series which are in some cases substituted with noninterfering substituents are suitable. The epoxy fatty acid component of the ester is made up of epoxy fatty acids of 10–30 carbons having an oxirane content above about 8.8. Suitable esters of this type are prepared from methyl, ethyl, propyl, isopropyl, butyl alcohols, as well as the hexyl, heptyl, and octyl alcohols. Dihydric alcohols which may be employed in preparing the oxirane-containing ester include the lower glycols such as ethylene glycol, 1,2-propanediol, 1,3-propanediol, dimethylethylene glycol, trimethylene glycol, tetramethylene glycol, and hexamethylene glycol.

The polyhydric alcohol esters of the high oxirane fatty acids include the tri-, tetra-, penta-, and hexahydric alcohol esters of the fatty acid moiety. Included within this group are those aliphatic alcohols having 3–6 carbons and three or more alcohol groups. This includes such alcohols as glycerol, erythritol, pentaerythritol, and hexitols such as mannitol and sorbitol.

The epoxy fatty acid portion of the oxirane-containing ester is made up of those fatty acids and mixtures of fatty acids having 10–30 carbons and an oxirane content above about 8.8. Mixtures of esters of epoxystearic, diepoxystearic, triepoxystearic, diepoxyeicosanoic, triepoxyeicosanoic, diepoxydocosanoic, triepoxydocosanoic, tetraepoxydocosanoic, and pentaepoxytetracosanoic acids are very desirable as the source of the oxirane-supplying radical.

Suitable naturally occurring oils which when epoxidized may be used as the source of the high-oxirane component are those vegetable and marine triglycerides containing a large proportion of unsaturated fatty acids. The linolenic acid oils which are primarily triglycerides of linoleic and linolenic acids are preferred. Among those oils which may be employed are highly epoxidized perilla oil and highly epoxidized linseed oil. Purified and concentrated fatty acid mixtures containing a large amount of unsaturated fatty acids may be obtained from such oils as soybean oil, tall oil, or from the fish oils. These materials, if first refined as by propane fractionation or urea adduct formation or other techniques for concentrating unsaturated fatty acid mixtures, when epoxidized provide a large quantity of epoxy groups. The esters of higher fatty acids containing 10–30 carbon atoms, the acyl group of said fatty acids containing sufficient oxirane substituents to provide in the esters an oxirane content of about 8.5–12.3 when the alcohol portion of the ester is a lower aliphatic alcohol when formed as the water-soluble polymer can be employed to produce very hard, chemically resistant, yet flexible films and coatings.

The carboxyl group-supplying agent which is employed in approximately stoichiometric amounts based on the number of epoxy groups in the polyepoxide includes organic, aliphatic, and benzenoid dibasic and polybasic acids and anhydrides. Usually about one carboxyl group for every oxirane group present in the polyepoxide is available in the partial polymerization reaction. The aliphatic dicarboxylic acids of both the saturated and unsaturated type such as oxalic, malonic, adipic, maleic, and fumaric acids can be used as the dicarboxylic acid. Tri- and tetracarboxylic acids of the aliphatic class including citric acid, tartaric acid, aconitic acid, itaconic acid, and tricarballylic acid are suitable polycarboxylic acids. Benzenoid di- and polycarboxylic acids which may be employed include phthalic acid, isophthalic acid, terephthalic acid, prehnitic acid, mellophanic acid, trimesic acid, mellitic acid, hemimellitic acid, trimellitic acid and pyromellitic acid.

Suitable anhydrides of polycarboxylic aliphatic and aromatic acids include maleic anhydride, phthalic anhydride, tetrachlorophthalic anhydride, tetrahydrophthalic anhydride, 1,3-cyclopentanedicarboxylic acid anhydride, citraconic acid anhydride, pyromellitic dianhydride, trimellitic anhydride, and other polybasic acid anhydrides which upon hydrolysis with water provide two or more carboxyl groups. Additional suitable anhydrides include HET anhydride (1,4,5,6,7-hexachloro-bicyclo(2.1)-5-heptene-2,3-dicarboxylic anhydride), Nadic anhydride, endo-cis-bicyclo(2.2.1)-5-heptene-2,3-dicarboxylic acid anhydride, and chlorendic anhydride. When the anhydride or mixture of anhydrides is employed as the source of carboxyl groups it is necessary to include a small amount of water to convert anhydride groups to carboxyl groups to insure that the carboxyl groups are free to react.

The temperatures at which the partial polymerization is carried out will depend upon the acid or anhydride employed, with the less reactive acids such as phthalic acid requiring somewhat higher temperatures than the more reactive acids such as pyromellitic acid. Also, the ease with which the acid or anhydride is solubilized by the solvent and/or oxirane-containing fatty material is important in that the more easily soluble acids and anhydrides, require less drastic heating conditions than the less reactive and less soluble acids and anhydrides. Generally temperatures in the range of 32–130° C. have been found satisfactory. While higher temperatures might be employed, the difficulty of stopping the reaction at these higher temperatures makes high temperature operation less desirable. The water soluble prepolymers can be characterized as having in one higher fatty chain the structure:

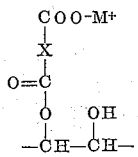

where X is selected from the group consisting of alkylene radicals of 1–10 carbons, carboxyl substituted alkylene radicals of 1–10 carbons; phenylene radicals, carboxyl substituted phenylene radicals and mixtures thereof; and M is selected from the group consisting of ammonium and volatile tertiary amino radicals.

The following examples illustrate the preparation of the water-soluble prepolymer from the polyepoxide and carboxyl-supplying agent.

*Example I*

A mixture of 306 grams epoxidized linseed oil (approximate mol wt. 980 oxirane content 9.0, iodine value 4.0) and 100 grams fumaric acid were dissolved in sufficient dimethylformamide to dissolve the acid. The mixture in the solvent was agitated and heated to 100° C. The reaction proceeded rapidly, causing an exothermic peak of 140° C. in 10 minutes. At this point, 100 milliliters of 28% aqueous ammonia was added to neutralize the unreacted fumaric acid and form the salt of the polyester. The ammonium salt of the polyester was water-soluble.

*Example II*

A mixture of 306 grams epoxidized linseed oil (oxirane content 9.7, iodine value 2.0) and 100 grams maleic acid was dissolved in tetrahydrofuran and the mixture was refluxed for one hour at 65° C. 60 milliliters of 28% aqueous ammonia and 750 milliliters of water were added and tetrahydrofuran was removed from the water solution by fractional distillation. The polymer was soluble in the water solution.

*Example III*

A mixture of 306 grams epoxidized linseed oil (oxirane content 9.2, iodine value 3.2) and 36 grams maleic acid was formed and dissolved in methanol. The methanol solution was heated at 60° C. until the viscosity of the mixture increased. At this point, 30 grams of morpholine was added to neutralize the unreacted maleic acid. The neutralized solution was water-soluble.

*Example IV*

A mixture of 200 grams epoxidized linseed oil (oxirane content 9.0, iodine value 4.0) and 42 grams tartaric acid was dissolved in methanol and the solution was heated for about 16 hours at 32° C. Morpholine was added to the reaction mixture in an amount of one part morpholine to ten parts of the reaction product exclusive of the solvent. After removal of the solvent by distillation the neutralized reaction product was soluble in water.

*Example V*

Pyromellitic acid (123 grams) and 400 grams epoxidized linseed oil (oxirane content 9.0, iodine value 4.0) was dissolved in tetrahydrofuran and the solution was refluxed at 65° C. for 2 hours. After neutralizing the reaction product with 250 milliliters of 28% aqueous ammonia and removing the solvent the product exhibited excellent water solubility.

*Example VI*

35 grams of epoxidized linseed oil (oxirane content 9.2, iodine value 3.2) and 19 grams trimellitic anhydride were refluxed in tetrahydrofuran at a temperature of 65° C. for 1 hr., 40 min. At the end of this time, 50 milliliters of water was added and all but a minor amount of the tetrahydrofuran was removed by distillation. 30 milliliters of 28% aqueous ammonium hydroxide was added and the reaction product was water-soluble.

*Example VII*

100 grams epoxidized linseed oil (oxirane content 9.0, iodine value 4.0) and 36 grams of citric acid were dissolved in dimethylformamide and the solution was refluxed at 100° C. for 2 hours. At this point, 200 milliliters of water and 25 milliliters of 28% aqueous ammonium hydroxide was added to produce a clear, amber solution of the polymer.

Epoxidized soybean oil, epoxidized safflower oil, epoxidized perilla oil, epoxidized cottonseed oil, and epoxidized marine oils such as epoxidized menhaden oil, when substituted for the epoxidized oils of the foregoing examples provide products having varying degrees of hardness and flexibility when deposited in the form of films and coatings.

The volatile base can be ammonia or any amine having a vapor pressure sufficiently high so that it is volatilized at elevated temperatures usually encountered in curing. Those primary secondary and tertiary aliphatic and aromatic amines boiling at about 175° C. or less are most satisfactory. Although primary and secondary alkyl amines can be employed tertiary amines are preferred since tertiary amines do not undergo amide formation when the compound is heated. Primary and secondary aliphatic amines are less favored since they do undergo amide formation when the amine salt is heated. Specific amines most useful in forming the salts include triethyl amine, trimethyl amine, tripropylamine, trimethylene diamine, morpholine, N-methyl morpholine, dimethyl aniline and other carbocyclic aromatic tertiary amines. Ammonia is also a very desirable volatile base.

The coating or film is deposited upon a substrate such as metal or glass by spraying, dipping, roller-coating, brush-coating, etc., and the substrate having the film deposited thereon is heated to cure the supported film.

Any substrate can be coated with the water-soluble resin and the resin cured on the surface thereof so long as the substrate, whether a fiber, film, sheet, piece or granule, can withstand a curing temperature of around 140° C. or above. The degree of heating required varies with the reactivity of the water-soluble polymer and also with the heat sensitivity of the material being coated. Those compositions having a higher oxirane content cure faster and form harder films than the lower oxirane-containing materials. Generally, in the coating and curing step the water is removed from the surface by heat and forced air or vacuum and the film is further heated to a temperature of about 100–200° C. Longer heating times are required at lower temperatures and much shorter heating times are necessary at higher temperature. The curing cycle for a given water-soluble polymer is easily determinable by those skilled in the art.

The coating material can be supplemented with coloring agents and other inert materials added to improve the appearance thereof.

Obviously, many modifications and variations of the invention as hereinbefore set forth may be made without departing from the spirit and scope thereof, and, therefore, only those limitations should be imposed as are indicated in the appended claims.

We claim:

1. A water-soluble coating composition comprising a fatty acid ester containing aliphatic hydrocarbon radicals having 9–29 carbons and at least one unreacted oxirane group and substituted at least once and not more than four times along said radicals on adjacent carbons with ester groups and hydroxy groups, the substitution in said radicals being characterized by the structure

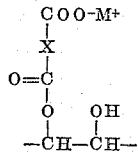

where X is selected from the group consisting of alkylene radicals of 1–10 carbons, carboxyl substituted alkylene radicals of 1–10 carbons, phenylene radicals, carboxyl substituted phenylene radicals and mixtures thereof and M is selected from the group consisting of ammonium and amino radicals of amines having a boiling point of less than about 175° C.

2. A water-soluble coating and film forming material comprising a glyceride containing an aliphatic hydrocarbon radical having 9–29 carbons and at least one unreacted oxirane group and substituted at least once and not more than four times along said radical on adjacent carbons with ester groups and hydroxy groups, the substitution being characterized by the structure

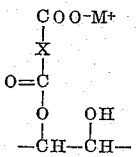

where X is selected from the group consisting of alkylene radicals of 1–10 carbons, carboxyl substituted alkylene radicals of 1–10 carbons, phenylene radicals, carboxyl substituted phenylene radicals and mixtures thereof and M is selected from the group consisting of ammonium and amino radicals of amines having a boiling point of less than about 175° C.

3. A water-soluble coating composition comprising a vegetable oil wherein at least one fatty acid chain contains an unreacted oxirane group and is substituted one to four times with ester groups and hydroxy groups on adjacent carbon atoms of said fatty chain, said substitution being characterized by the structure

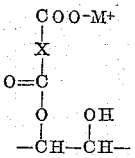

where X is selected from the group consisting of alkylene radicals of 1–10 carbons, carboxyl substituted alkylene radicals of 1–10 carbons, phenylene radicals, carboxyl substituted phenylene radicals and mixtures thereof and M is selected from the group consisting of ammonium and amino radicals of amines having a boiling point of less than about 175° C.

4. A water-soluble prepolymer comprising linseed oil having at least one fatty acid chain containing at least one unreacted oxirane group and is substituted at least once and not more than four times along said radicals on adjacent carbons with ester groups and hydroxy groups, the substitution on said radicals being characterized by the structure

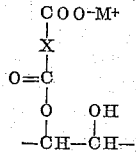

where X is selected from the group consisting of alkylene radicals of 1–10 carbons, carboxyl substituted alkylene radicals of 1–10 carbons, phenylene radicals, carboxyl substituted phenylene radicals and mixtures thereof and M is selected from the group consisting of ammonium and amino radicals of amines having a boiling point of less than about 175° C.

5. A method for preparing water-soluble prepolymer composition from fatty epoxides comprising: partially reacting a fatty epoxide having more than one epoxy group per molecule with approximately a stoichiometric amount of a carboxyl-supplying base selected from the group consisting of dicarboxylic acids, polycarboxylic acids, and anhydrides thereof until one carboxyl group of the carboxyl-supplying base is reacted with the epoxy groups of said fatty epoxide but before all carboxyl groups of said carboxyl-supplying base are reacted and at least one epoxy group of the fatty epoxide is left unreacted; and terminating said reaction by adding a material selected from the group consisting of ammonia and volatile amines having a boiling point of less than about 175° C. to said mixture.

6. A method for preparing polymers soluble in aqueous solution from fatty epoxides comprising: partially reacting an oxirane-containing fatty acid ester of an aliphatic alcohol, said ester containing more than one epoxy group per molecule with approximately a stoichiometric amount of a carboxyl-supplying organic acid selected from the group consisting of dicarboxylic acids, polycarboxylic acids, and anhydrides thereof to form a polyester having free carboxyl groups and at least one unreacted epoxy group and terminating said reaction by adding a material selected from the group consisting of ammonia and volatile amines having a boiling point of less than about 175° C.

7. The method of claim 5 wherein the reaction is carried out in the presence of an organic solvent for said carboxyl-supplying base and said fatty epoxide.

8. A method for preparing water-soluble polymers from oxirane-containing higher fatty acid esters, said fatty acid esters containing more than one oxirane group per molecule, comprising: heating said fatty acid ester at a temperature of 32–130° C. with approximately a stoichiometric amount of a material selected from the group consisting of dicarboxylic acids, polycarboxylic acids and anhydrides thereof to form a polyester having free carboxyl groups and at least one unreacted epoxy group and treating said polyester with a water-soluble, ionizable, nitrogen-containing, cation-supplying composition having a boiling point less than about 175° C.

9. The method of claim 8 wherein the oxirane-containing fatty acid ester is an oxirane-containing glyceride.

10. A method for preparing water-soluble polymers from fatty epoxides selected from the group consisting of oxirane-containing higher fatty acids, oxirane-containing higher fatty acid esters, oxirane-containing fatty ketones, oxirane-containing fatty amides, said fatty epoxide containing more than one epoxy group per molecule, comprising: heating said fatty epoxide at a temperature of 32–130° C. with approximately a stoichiometric amount of a material selected from the group consisting of dicarboxylic acids, polycarboxylic acids and anhydrides thereof to form a polyester having free carboxyl groups and at least one unreacted epoxy group, and treating said polyester with a water-soluble, ionizable, nitrogen-containing, cation-supplying nitrogen composition having a boiling point less than about 175° C.

References Cited by the Examiner
UNITED STATES PATENTS

| | | | |
|---|---|---|---|
| 2,559,177 | 7/51 | Terry et al. | 260—348 X |
| 2,761,870 | 9/56 | Payne et al. | 260—348 |
| 2,907,733 | 10/59 | Greenlee | 260—348 X |
| 2,941,968 | 6/60 | McKenna | 260—22 |
| 2,993,920 | 7/61 | Budde et al. | 260—404.8 |
| 3,050,480 | 8/62 | Budde | 260—22 |

IRVING MARCUS, *Primary Examiner.*

WALTER A. MODANCE, *Examiner.*

UNITED STATES PATENT OFFICE
CERTIFICATE OF CORRECTION

Patent No. 3,180,749                          April 27, 1965

Thomas W. Findley et al.

It is hereby certified that error appears in the above numbered patent requiring correction and that the said Letters Patent should read as corrected below.

Column 3, line 50, for "faty" read -- fatty --; column 8, line 65, after "175° C." insert -- to said mixture. --.

Signed and sealed this 21st day of September 1965.

(SEAL)
Attest:

ERNEST W. SWIDER                              EDWARD J. BRENNER
Attesting Officer                                  Commissioner of Patents